Patented June 5, 1945

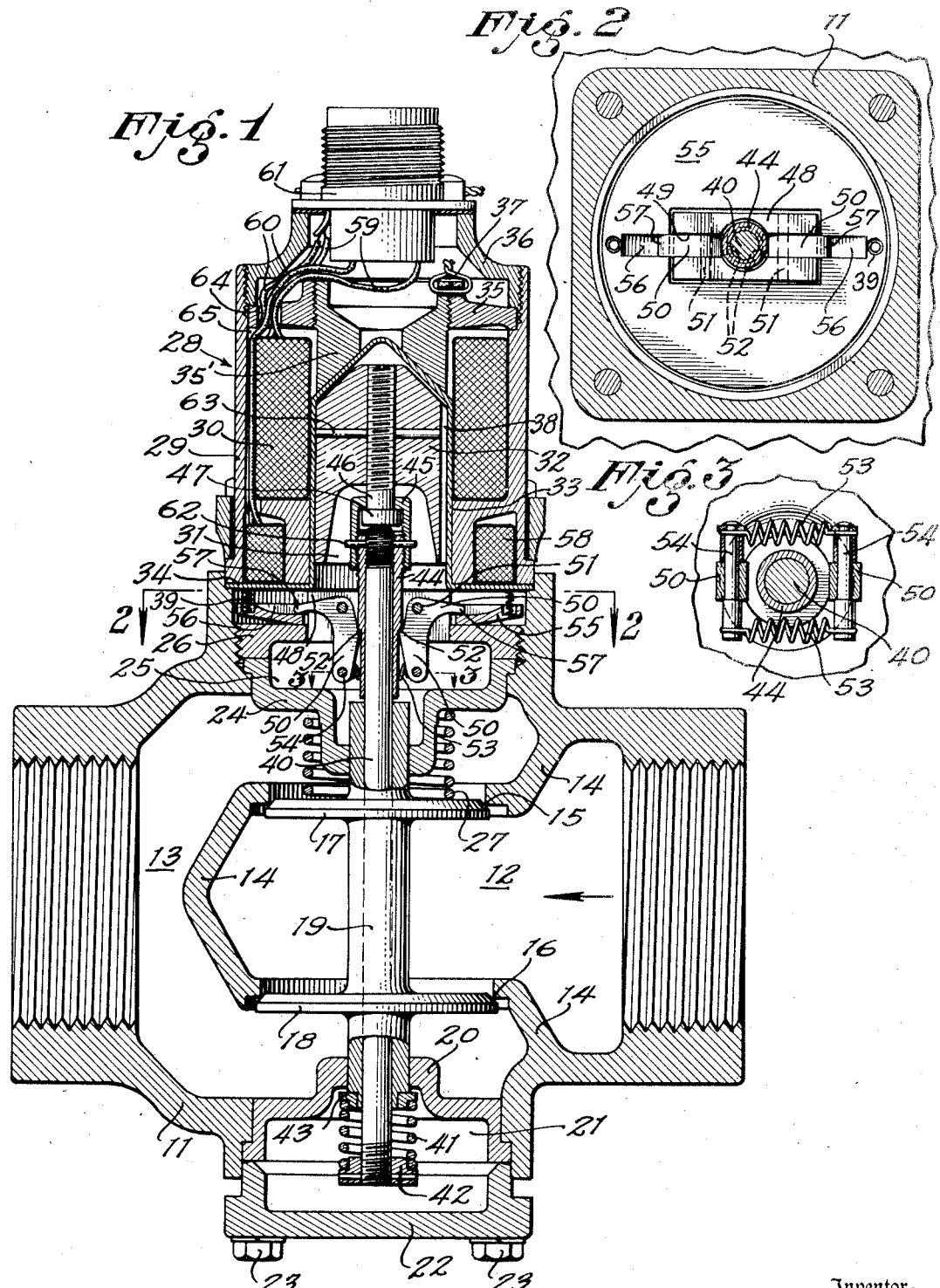

2,377,515

UNITED STATES PATENT OFFICE 2,377,515

ELECTROMAGNETIC OPERATOR

William A. Ray, Los Angeles, Calif.

Application January 19, 1942, Serial No. 427,231

10 Claims. (Cl. 175—337)

My present invention relates to improvements in electromagnetic operators, and particularly in those of the "non-current-failure" type in which momentary energization of a "setting" electromagnet causes the operated device to move to a first position, against a biasing force, in which position it is mechanically held by a latch mechanism until released by a latch-tripping means, which may conveniently be operated by an additional electromagnet, allowing the operated device to return to its unmoved position under the force of its bias.

While not so limited, this invention has particular utility when used in connection with valves of the "portable" type used in airplanes and other machines and in which dependability must be incorporated with a compact and light-weight structure. Such valves and their operators require very accurate machining and assembly as the weight factor precludes the use of heavy-current operators, and the movement of the various parts is correspondingly small and precise. It is therefore an object of this invention to provide an operator of the type indicated that is exceptionally light and compact and that can be readily machined and assembled.

Another object is to provide novel means for adjusting the relative positions of certain of the parts whereby accurate assembly is facilitated.

Another object is to provide, in a solenoid operator, packless sealing means whereby the energizing coil is shielded from the fluid controlled by the valve, and all of the moving parts are protected from dirt and other foreign matter; the sealing means also serving as a magnetic separator, whereby magnetic sticking of the solenoid plunger is eliminated.

Other objects and advantages of my invention will be found in the description, the drawing and the appended claims; and for complete understanding of the invention, reference may be had to the following detailed description and accompanying drawing, wherein:

Figure 1 is a view, in vertical section, of a valve embodying my invention;

Figure 2 is a horizontal section taken along the line 2—2 of Fig. 1; and

Figure 3 is a fragmentary horizontal section taken along the line 3—3 of Fig. 1.

In the drawing, the numeral 11 indicates a valve casing having an inlet 12 and an outlet 13 separated by a ported partition 14 providing in its horizontal portions a pair of valve seats 15 and 16 with which closure members 17 and 18, respectively, cooperate to provide a semi-balanced valve structure. The closure members 17 and 18 are integral with a tubular valve stem 19 which is closely guided at its lower end by a bushing 20. This bushing is held in place, in an opening 21 formed in the underside of the casing 11, between a shouldered portion thereof and a sealing cap 22 clamped to the casing by screws 23. The lower opening in the partition 14 controlled by closure member 18 is sufficiently large to permit passage of the closure member 17 therethrough in the assembly of the valve. For the same reason, opening 21 in the casing 11 must be of greater diameter than closure member 18. The valve stem 19 is closely guided at its upper end by a bushing 24 secured in an opening 25 in the top wall of the casing 11 by a threaded disk 26, made of non-magnetic material, between which and a shouldered portion of the casing, the marginal portion of the bushing extends. A spring 27, compressed between the closure member 17 and the bushing 26, constantly urges the closure members toward their normally open positions.

Mounted on the top wall of the casing 11, and closing the opening 25 therein, is an electromagnet 28 having a fixed core 29 and a "setting" energizing coil 30 providing a central opening 31 wherein a solenoid plunger 32 is adapted to reciprocate. A non-magnetic plunger tube 33 extends into the opening 31 and serves to prevent magnetic sticking of the plunger and also to provide a packless means for sealing the electromagnet from the interior of the valve, the tube having a laterally extending flange 34, the marginal portion of which is secured between the casing 11 and the lower end of the core 29. The plunger 32 has a groove 38 extending throughout its length to permit escape of fluid, trapped in the tube 33, in the upward movement of the plunger. The upper end of the tube 33 is shaped to conform to the conical upper end of the plunger 32 and is reinforced by a correspondingly conically recessed head-stop 35' which is threaded in a supporting ring 35, clamped at its outer margin between a shouldered portion of the core 29 and a threaded cap 36. The head-stop 35' and ring 35 are both of magnetic material and complete the magnetic flux path between the plunger 32 and the core 29. The head-stop is made adjustable in the ring 35 to facilitate construction and to permit the stop to be brought into close engagement with the head of the plunger tube so that there is no undesirable air gap between them. The head-stop is locked in adjusted position by a wire 37.

Extending axially through the tubular valve stem 19, and loosely guided thereby, is a rod 40, around the lower end portion of which is a spring 41 compressed between a nut 42 threaded on the rod and a washer 43 abutting the lower end of the valve stem. The spring 41 must be of greater strength than the spring 27 in order to exert sufficient seating pressure on the closure members. Threaded on the upper end of the rod 40 is a sleeve 44, of tool steel, on the outer upper end of which is threaded a cup-shaped member 45 having an opening in its top wall through which a bolt 46 extends and is threaded in a central opening in the plunger 32. Only sufficient clearance is provided between the upper end of the rod 40 and the lower end of the head 47 of the bolt 46 to permit a swivel connection between the plunger assembly and the rod assembly.

The rod 40 and sleeve 44 extend through a central opening in the disk 26, which disk has a centrally-located, raised, rectangularly shaped portion 48 which abuts the horizontal flange 34 of tube 33 adjacent the wall of the opening 31. Longitudinally of the raised portion 48 and extending through the disk 26 is a slot 49 in which a pair of bell-crank members 50 are pivotally secured by pins 51. The bell-cranks are provided with detent portions 52 which are adapted to engage a shouldered portion of the sleeve 44, formed by reducing the diameter of the lower portion thereof. The detent portions 52 are maintained in constant engagement with the sleeve 44 by means of tension springs 53 secured on pins 54 which extend through openings in the lower end portions of the bell-cranks. Positioned above the disk 26, and normally in engagement with the top side thereof, is a disk type armature 55 having a rectangular opening through which the raised portion 48 of the disk 26 loosely extends. The armature 55 is channeled at 56 to receive the end portions 57 of the bell-cranks 50. The lower, thickened end portion of the core 29 is annularly recessed to receive a "tripping" coil 58, the energization of which is adapted to raise the armature 55. A plurality of springs 39 are arranged to exert a constant light force on the armature, tending to hold it in depressed position when the bell-cranks 50 are out of engagement therewith. It will be seen that a portion of the flux paths is common in both the setting and tripping magnetic circuits, whereby a reduction in weight is achieved. Leads 60 of coil 58, and leads 59 of coil 30, extend through an opening 64 in the supporting ring 35 to a terminal socket 61, the core 29 being grooved to provide a passageway 65 for the reception of the leads 60.

In the assembly of the device, the desired valve-seating pressure of spring 41 is adjusted by varying the position of the sleeve 44 on rod 40. The bolt 46 is then attached to the rod 40, through the sleeve 44, by the cup-shaped member 45 which is so positioned that the clearance between the bolt head 47 and the top of rod 40 is only sufficient to permit rotation of the bolt. The parts 45, 44 and 40 are then locked in position by a pin 62 inserted in a hole then drilled through these parts. The plunger 32 is threaded onto the bolt 46 to such a distance that, when (as determined by measurement) its upper end would be in engagement with the closed end of the tube 33, the shoulder on the sleeve 44 is a few thousandths of an inch above the detents 52. After adjustment, a hole is drilled through the plunger and bolt for a lock-pin 63.

The operation of the device is as follows: with the parts in the positions shown in the figures, the valve is held in its closed position by the engagement of detents 52 with the shoulder of sleeve 44. Upon energization of the tripping coil 58 the armature 55 moves upward, rocking the bell cranks 50 to such positions that the detents 52 are disengaged from the sleeve shoulder. The rod 40 thereupon moves downward under the force of spring 41, permitting the closure members 17 and 18 to move to their open positions under the force of spring 27. Obviously, the energization of the tripping coil need be only momentary to effect this result, and the armature will assume its original position upon deenergization of the coil. Upon subsequent energization of the setting coil 30, the plunger is raised until it engages the upper end of the tube 33. The detents 52 are now in engagement with the reduced lower end portion of the sleeve 44 just below its shoulder, and upon deenergization of the setting coil the plunger and rod assembly are then held in the positions shown in the drawing. Thus, the valve is moved to one position upon momentary energization of one of the electromagnet coils, and automatically retained in that position to which it has been moved until subsequent energization of the other coil.

While I have herein shown and described, by way of illustration, a specific embodiment of my invention, I wish it to be understood that modifications may be made without departing from the spirit of the invention, and that I intend therefore to be limited only by the scope of the appended claims.

I claim as my invention:

1. In an operator: an electromagnet comprising an energizing coil having an opening therethrough, a plunger reciprocable in said opening and biased toward a first position, said coil being effective when energized to move said plunger to a second position against the force of said bias, mechanical latching means for retaining said plunger in said second position when said electromagnet is subsequently deenergized, an additional electromagnet for releasing said latching means, and flux-conducting means fixedly associated with said electromagnets, a portion of the flux paths of the magnetic circuits of both of said electromagnets being common.

2. In an operator: an electromagnet comprising an energizing coil having an opening therethrough, a plunger reciprocable in said opening and biased toward a first position, said coil being effective when energized to move said plunger to a second position against the force of said bias, mechanical latching means for retaining said plunger in said second position when said electromagnet is subsequently deenergized, a movable armature coaxial with said plunger, means forming an additional electromagnet for moving said armature comprising an energizing coil, said last-named coil being positioned between said armature and said first-named coil, and means operable by the movement of said armature by said additional electromagnet for releasing said latching means.

3. In an operator: a first electromagnet comprising a hollow coil and a plunger reciprocable therein, means biasing said plunger outwardly of said coil, said coil being effective when energized to move the plunger therewithin to a first position against the force of said bias, a stem connected to the plunger and movable therewith, said stem when in moved position extending exteriorly of said coil, latching means cooperable with said stem when the same is in its moved position to retain it in that position when the coil is subsequently deenergized, means forming a second electromagnet surrounding said stem and including a movable armature, and means whereby movement of said armature due to energization of said second electromagnet effects release of said latching means.

4. In an operator: a first electromagnet comprising a hollow coil and a plunger reciprocable therein, means biasing said plunger outwardly of said coil, said coil being effective when energized to move the plunger therewithin to a first position against the force of said bias, a stem connected to the plunger and movable therewith, said stem when in moved position extending exteriorly of said coil, latching means comprising a pair of members disposed on opposite sides of said stem and cooperable with the stem when the same is in its moved position to retain it in that position when the coil is subsequently deenergized, means forming a second electromagnet surrounding said stem and including a movable armature, and means comprising a pair of bell-cranks pivoted for movement by said armature when the second electromagnet is energized for effecting release of said latching means.

5. In an operator: a first electromagnet comprising a coil having an opening therethrough and a plunger reciprocable in said opening, means biasing said plunger outwardly of said opening, said coil being effective when energized to move the plunger therewithin to a first position against the force of said bias, a stem connected to said plunger and movable therewith, said stem when in moved position extending exteriorly of said coil, latching means cooperable with said stem when the same is in its moved position to retain it in that position when the coil is subsequently deenergized, a movable armature having a central opening through which said stem extends, a core for said coil and fixed with respect thereto, said core surrounding the outer surface of said coil and having an end portion extending adjacent the end of said coil-opening through which said stem extends, a coil mounted in a recess in said end portion and forming therewith a second electromagnet having pole faces cooperable with said armature, and means whereby movement of said armature due to energization of said second electromagnet effects release of said latching means.

6. In an electromagnetic solenoid comprising a fixed core, an energizing coil having an opening therethrough, and a plunger reciprocable in said opening: a guide tube of non-magnetic material interposed between said coil and said plunger and mounted on said core, said guide tube having a thin inner end wall engageable by the plunger when the solenoid is energized, and a member mounted on said core and so engaging said end wall that impact of the plunger on the end wall is resisted by the core through said member, said member being so adjustable with respect to said end wall that it can be brought into tight backing-up engagement therewith.

7. The combination defined in claim 6, wherein said backing-up member is of magnetic material.

8. The combination defined in claim 6, wherein said end wall of the guide tube is of non-magnetic material and said backing-up member is of magnetic material.

9. In an electromagnetic solenoid comprising a fixed core, an energizing coil having an opening therethrough, and a plunger reciprocable in said opening: a guide tube of non-magnetic material interposed between said coil and said plunger and having a circumferential flange adjacent one end of said coil-opening, the other end of said tube adjacent the other end of the coil-opening being closed by an integral thin wall engageable by said plunger when the solenoid is energized, a member mounted on said core and so engaging the outer surface of said wall that impact of the plunger on the wall is resisted by the core through said member, said member being so adjustable with respect to said surface that it can be brought into tight backing-up engagement therewith, a base for said core, and means for securing the core to said base with said tube flange therebetween.

10. The combination defined in claim 9, wherein said backing-up member is of magnetic material.

WILLIAM A. RAY.